US012483651B2

(12) United States Patent
Patel et al.

(10) Patent No.: US 12,483,651 B2
(45) Date of Patent: Nov. 25, 2025

(54) METHOD OF ANALYZING VOICE OVER INTERNET PROTOCOL COMMUNICATION AND SYSTEM FOR IMPLEMENTING THE SAME

(71) Applicant: Rakuten Mobile, Inc., Tokyo (JP)

(72) Inventors: Manish Patel, Indore (IN); Siddharth Jain, Indore (IN); Jeetesh Acharya, Indore (IN); Shubham Rathore, Indore (IN)

(73) Assignee: RAKUTEN MOBILE, INC., Tokyo (JP)

(*) Notice: Subject to any disclaimer, the term of this patent is extended or adjusted under 35 U.S.C. 154(b) by 0 days.

(21) Appl. No.: 18/002,050

(22) PCT Filed: Oct. 21, 2022

(86) PCT No.: PCT/US2022/047365
§ 371 (c)(1),
(2) Date: Dec. 16, 2022

(87) PCT Pub. No.: WO2024/085881
PCT Pub. Date: Apr. 25, 2024

(65) Prior Publication Data
US 2024/0380836 A1    Nov. 14, 2024

(51) Int. Cl.
*H04M 3/00* (2024.01)
*H04L 12/66* (2006.01)
(Continued)

(52) U.S. Cl.
CPC ......... *H04M 3/2218* (2013.01); *H04M 7/006* (2013.01)

(58) Field of Classification Search
CPC ......... H04M 1/72457; H04M 2201/38; H04M 2203/258; H04M 3/2218; H04M 3/2227;
(Continued)

(56) References Cited

U.S. PATENT DOCUMENTS 9,386,427 B1 * 7/2016 Narasimhan ............ H04W 4/14
2010/0186055 A1 * 7/2010 Gupta ................ H04N 21/4788
725/106
(Continued)

FOREIGN PATENT DOCUMENTS

JP         2011061633 A      3/2011

*Primary Examiner* — Kharye Pope
(74) *Attorney, Agent, or Firm* — HAUPTMAN HAM, LLP

(57) ABSTRACT

A method of performing call analytics includes initiating a call on a mobile device, wherein the mobile device is connected to a network, and the call is initiated on a communication application executed by the mobile device. The method further includes determining whether data gathering for the communication application is initialized. The method further includes in response to determining that data gathering for the communication application is initialized: capturing a location of the mobile device; capturing a time of the initiated call; retrieving call information data from the communication application; retrieving call performance data from the communication application; and transmitting the location of the mobile device, the time of the initiated call, the call information data, and the call performance data.

20 Claims, 6 Drawing Sheets

(51) Int. Cl.
*H04M 3/22* (2006.01)
*H04M 5/00* (2006.01)
*H04M 7/00* (2006.01)

(58) Field of Classification Search
CPC ........ H04M 3/36; H04M 7/006; H04M 15/00;
H04M 3/42348; H04M 2242/30; H04M
15/06; H04W 4/16; H04W 24/02; H04W
24/04; H04W 4/021; H04W 4/029; H04W
40/02; H04W 4/025; H04W 4/90
See application file for complete search history.

(56) References Cited

U.S. PATENT DOCUMENTS

| | | | |
|---|---|---|---|
| 2010/0186056 A1* | 7/2010 | Li | H04N 21/2187 |
| | | | 725/109 |
| 2012/0201143 A1* | 8/2012 | Schmidt | H04W 48/18 |
| | | | 455/434 |
| 2014/0180438 A1* | 6/2014 | Hodges | H04M 1/67 |
| | | | 700/11 |
| 2015/0024725 A1* | 1/2015 | Lang | H04W 4/021 |
| | | | 455/417 |
| 2017/0208435 A1* | 7/2017 | Jordan | H04W 4/021 |
| 2018/0097853 A1* | 4/2018 | Wiley | H04M 7/0066 |
| 2020/0084316 A1* | 3/2020 | Jacob | H04M 3/2218 |
| 2022/0044693 A1* | 2/2022 | Liang | G10L 19/02 |
| 2022/0124517 A1* | 4/2022 | Guo | H04W 24/04 |
| 2023/0260384 A1* | 8/2023 | Haines | H04W 8/16 |
| | | | 455/411 |
| 2023/0362582 A1* | 11/2023 | MacGougan | H04W 4/022 |

* cited by examiner

METHOD OF ANALYZING VOICE OVER INTERNET PROTOCOL COMMUNICATION AND SYSTEM FOR IMPLEMENTING THE SAME

RELATED APPLICATIONS

The present application is a National Phase of International Application No. PCT/US2022/047365, filed Oct. 21, 2022.

TECHNICAL FIELD

This description relates to a method of analyzing voice over internet protocol (VOIP) communication and a system for implementing the same.

BACKGROUND

Voice over internet protocol (VOIP) communication includes wireless audio and/or visual communication. Unlike, standard telephonic communication, VOIP communication is implemented using the communication applications installed on a mobile device. For example, mobile devices, such as mobile phone, utilize communication applications in order to communicate with other users of the communication application. The communication occurs using a telecommunication network in some instances.

Since the communication occurs using a communication application utilizing internet protocol (IP) over the telecommunication network, performance of the telecommunication network impacts the experience of a user utilizing the VOIP communication. However, the inclusion of the communication application increases a complexity for determining whether any communication problems experiences have a root cause within the telecommunication network or have a different source.

SUMMARY

An aspect of this description relates to a method of performing call analytics. The method includes initiating a call on a mobile device, wherein the mobile device is connected to a network, and the call is initiated on a communication application executed by the mobile device. The method further includes determining whether data gathering for the communication application is initialized. The method further includes in response to determining that data gathering for the communication application is initialized: capturing a location of the mobile device; capturing a time of the initiated call; retrieving call information data from the communication application; retrieving call performance data from the communication application; and transmitting the location of the mobile device, the time of the initiated call, the call information data, and the call performance data.

An aspect of this description relates to a method of performing call analytics. The method includes receiving call data. The call data includes a time of a call performed using a mobile device connected to a network, a location of the mobile device during the call, call information data, and call performance data. The method further includes processing the call data, wherein processing the call data comprises correlating call performance data with network performance data based on the call information data. The method further includes generating at least one visualization based on the processed call data. The method further includes displaying the at least one visualization. The method further includes determining a network performance during the call based on the at least one visualization.

An aspect of this description relates to a system for performing call analytics. The system includes a non-transitory computer readable medium configured to store instructions thereon. The system further includes a processor connected to the non-transitory computer readable medium. The processor is configured to execute the instructions for receiving call data. The call data includes: a time of a call performed using a mobile device connected to a network, a location of the mobile device during the call, call information data, and call performance data. The processor is further configured to execute the instructions for processing the call data, wherein processing the call data comprises correlating call performance data with network performance data based on the call information data. The processor is further configured to execute the instructions for generating at least one visualization based on the processed call data. The processor is further configured to execute the instructions for instructing a display to display the at least one visualization. The processor is further configured to execute the instructions for determining a network performance during the call based on the at least one visualization.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
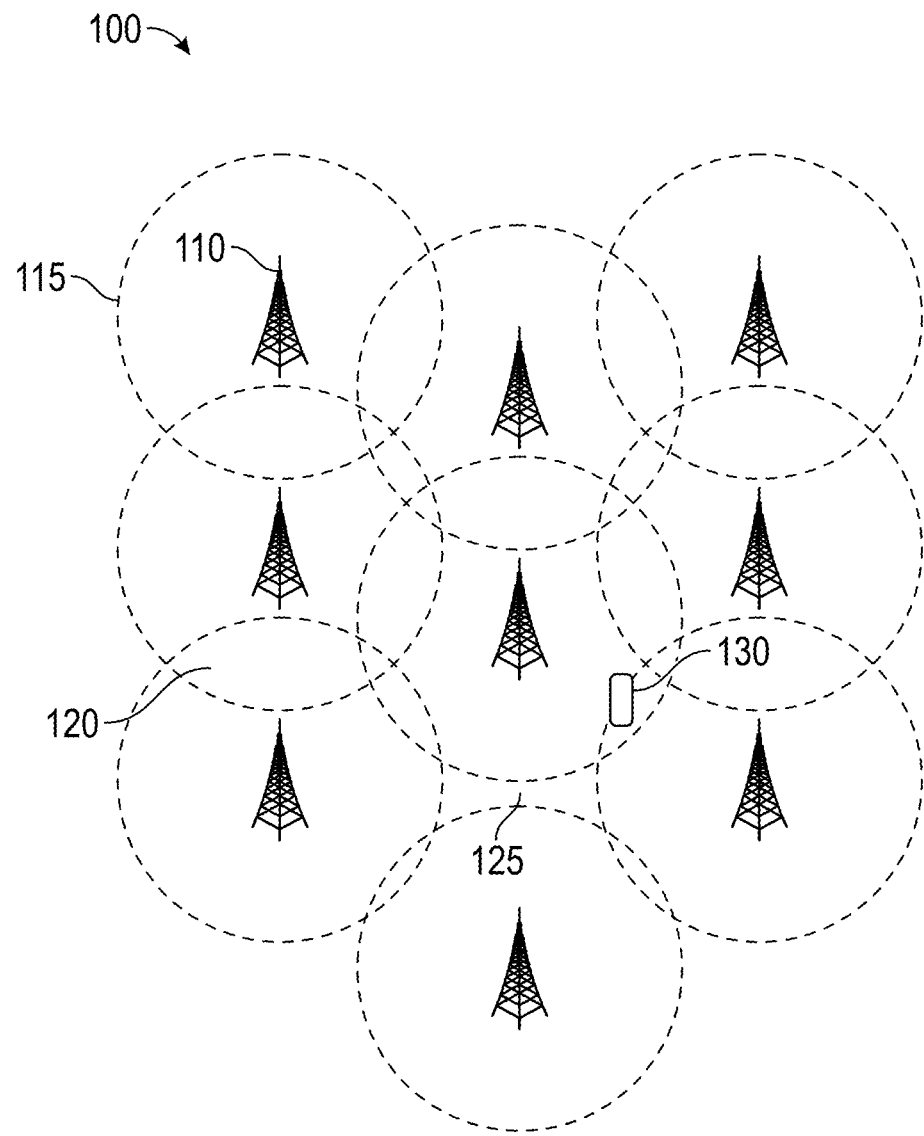
FIG. 1 is a schematic diagram of a telecommunication network in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Voice over internet protocol (VOIP) communication is implemented using communication applications. Examples of communication applications include Skype®, Teams®, WeChat®, Line®, WhatsApp®, etc. These communication applications are installed on a mobile device that is capable of connecting to a telecommunication network, also called a network in some instances. The communication application is able to perform audio and/or visual communication, also called a call in some instances, by exchanging data over the telecommunication network.

Since the telecommunication network is used to transfer data between the mobile device running the communication application and another party to the call, performance of the telecommunication network impacts the quality of the communication. In some instances, a user of a communication application will experience poor communication quality and consider the problem to be a result of poor telecommunication network performance. However, in some instances, the mobile device or other components in the communication is a source of poor communication quality. In order to monitor telecommunication network performance in combination with communication quality for VOIP calls, the current application includes a method of capturing data related to key performance indicators (KPIs) of the mobile device and KPIs of the communication application in order to help determine a root cause for poor communication performance.

The method includes receiving information such as mobile device location, call type, packet loss, latency, and other relevant data to determine how the telecommunication network performed during the call. Once a determination is made regarding the performance of the telecommunication network, a network provider is able to determine whether repairs or maintenance should be performed on the network; whether new site locations should be added to the network; whether the root cause of poor communication quality is the mobile device; or other suitable feedback to the user of the mobile device to improve future communication.

In some embodiments, the method further includes displaying of call analytics to a network monitor. In some embodiments, the method further includes generating user interfaces (UIs) to assist the network monitor is evaluating network performance. In some embodiments, the method further includes generating recommendations for improving network performance based on the call analytics.

FIG. 1 is a schematic diagram of a telecommunication network 100 in accordance with some embodiments. The telecommunication network 100 includes a plurality of base stations 110 and each base station 110 has a corresponding coverage area 115. In some instances, cover areas 115 for neighboring base stations 110 overlap one another to define an overlapping coverage area 120. In some instances, a gap 125 exists between coverage areas 115 of neighboring base stations 110. A mobile device 130 within the telecommunication network 100 is able to connect to one or more base station 110 when the mobile device 130 is within the coverage area 115 corresponding to the base station 110. In some instances, the mobile device 130 runs one or more communication applications used in VOIP communication. In order to assist with analytics of a VOIP call, location and other KPI data for the mobile device 130 are captured. The location and other KPI data are analyzed to determine performance of the telecommunication network 100 during the VOIP call.

The telecommunication service provider, also called a network provider, is responsible for maintaining the base stations 110 and minimizing a size and number of gaps 125 in the coverage areas 115 of the telecommunication network 100. In some embodiments, the service provider becomes aware of a connectivity issue with the mobile device 130. In some embodiments, the service provider becomes aware of the connectivity issue through communication with a user of the mobile device 130. In some embodiments, the service provider becomes aware of the connectivity issue through monitoring of KPIs within the telecommunication network 100, or through other monitored parameters. If the mobile device 130 is within the gap 125, the service provider is likely to provide instructions for service or maintenance of one of more base stations 110 adjacent to the gap 125 in order to reduce or remove the gap 125 from the telecommunication network 100.

However, if the mobile device 130 is determined to be a root cause of poor communication quality for a VOIP call dispatching a service or maintenance team to any of base stations 110 is a waste of time or resource because the cause of the poor communication quality does not result from the telecommunication network 100. In some embodiments, the service provider is able to use information, e.g., collected using method 200 (FIG. 2), from the mobile device 130 to determine a root cause of any poor communication quality in order to make a more informed decision regarding whether to dispatch the service or maintenance team.

Figure 2:
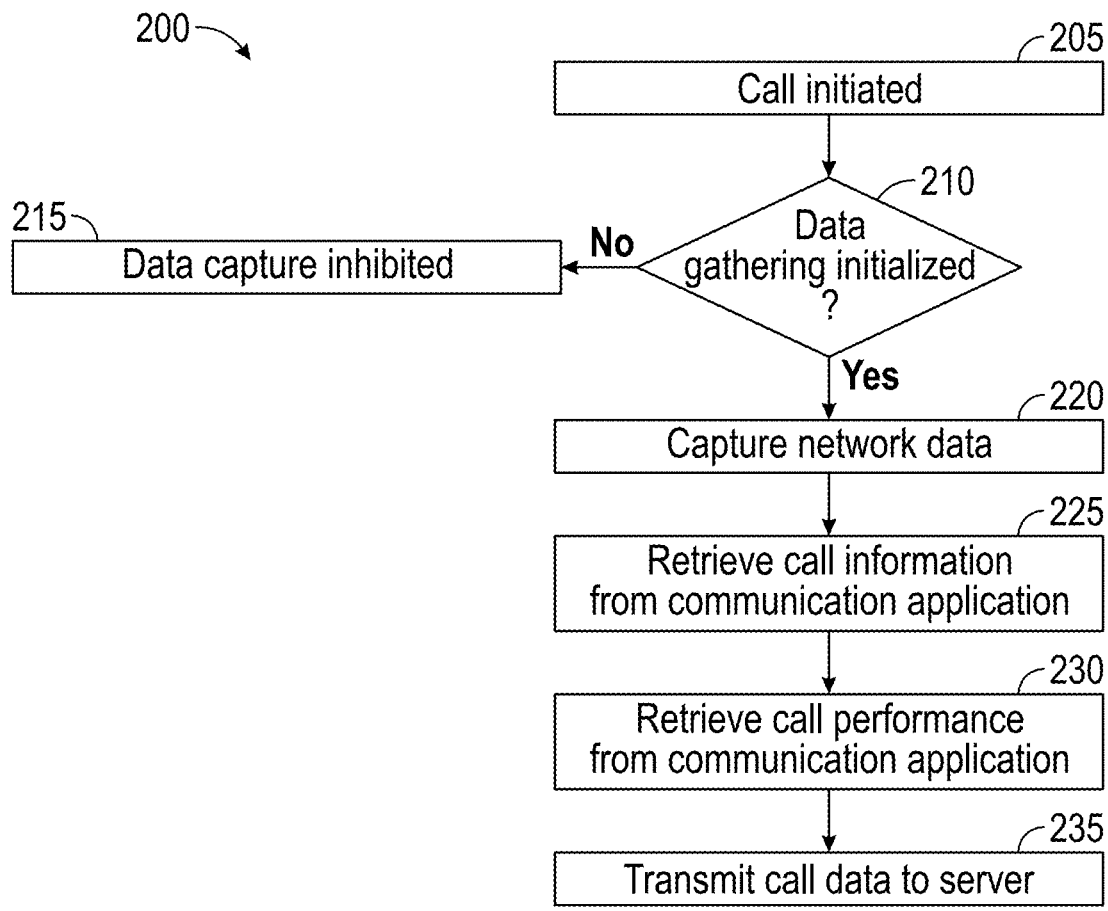
FIG. 2 is a flowchart of a method of collecting communication data from a VOIP communication in accordance with some embodiments.

FIG. 2 is a flowchart of a method 200 of collecting communication data from a VOIP communication in accordance with some embodiments. The method 200 is usable to collect data related to communication quality and network performance in order to evaluate a root cause of problems with a VOIP call. In some embodiments, the method 200 is implemented entirely on a mobile device, such as a mobile phone, used to make a VOIP call. In some embodiments, a portion of the method 200 is implemented on a device external to the mobile device.

In operation 205, a call is initiated. The call is a VOIP communication. The call is initiated using a communication application on a mobile device, e.g., mobile device 130 (FIG. 1). In some embodiments, the call is an audio only call. In some embodiments, the call is a video only call. In some embodiments, the call includes audio and video. In some embodiments, the call is an outgoing call, i.e., a call initiated by the user of the mobile device. In some embodiments, the call is an incoming call, i.e., a call received by the mobile device from an external source.

In operation 210, a determination is made regarding whether data gathering is initialized. In some embodiments, the data gathering is implemented by the mobile device using a program other than the communication application. In order to initial data gathering the program is granted access to information within the communication application and/or other components within the mobile device, such as a global position system, a clock, or other suitable components. In some embodiments, the user authorizes initiation of data gathering. In some embodiments, once a user authorizes initiation of data gathering, then data gather remains initialized for each subsequent call initiation until or unless the user retracts the authorization. In some embodiments, the operation 210 is implemented using the method 300 (FIG. 3), discussed below.

In response to a determination that data gathering is not initialized, the method 200 proceeds to operation 215. In response to a determination that data gathering is initialized, the method 200 proceeds to operation 220.

In operation 215, data capture is inhibited. In some embodiments, inhibition of data capturing means that KPI data related to the call initiated in operation 205 is not collected. In some embodiments, inhibition of data capturing means that the KPI data related to the call initiated in operation 205 is collected, but is not transmitted outside of the mobile device without separate authorization from the user. In some embodiments, the operation 215 includes providing a notification to the user regarding inhibition of data capture. In some embodiments, the notification includes an audio alert, e.g., a tone, or a visual alert, e.g., text or an icon.

In operation 220, network data is captured. Network data includes network KPIs usable to determine performance of the network at a location of the mobile device. In some embodiments, operation 220 is performed based on detected data at the mobile device. In some embodiments, operation 220 is performed by a device external to the mobile device, e.g., a network server, based on a time of the call initiated in operation 205, a duration of the call, and a location of the mobile device during the call.

The following examples of network KPIs are collectable in isolation or in any combination with each other. In some embodiments, the network KPIs include technology of the call, e.g., wireless fidelity (WiFi), fourth-generation (4G), fifth-generation (5G), long term evolution (LTE), or other suitable technology. In some embodiments, the network KPIs include cell global identity (CGI) of a base station connected to the mobile device during the call. In some embodiments, the KPIs of the network date and time of the call. In some embodiments, the KPIs of the network include physical cell identification (PCI) of a base station connected to the mobile device. In some embodiments, the KPIs of the network include reference signal received power (RSRP) of a base station connected to the mobile device. In some embodiments, the network KPIs further track handover of the mobile device between different base stations during the call.

In operation 225, call information is retrieved from the communication application. The call information includes information about the type of call as well as information about the mobile device. In some embodiments, the call information is retrieved by querying the communication application and/or querying an operating system of the mobile device. The call information helps with analytics by identifying commonalities from call that experience poor communication quality. For example, a situation where both video calls and audio calls experience similar poor communication quality indicates a gap, e.g., gap 125, in the network.

The following examples of type of call are collectable in isolation or in any combination with each other. In some embodiments, the type of call information includes whether the call in incoming or outgoing. In some embodiments, the type of call information includes whether the call was an audio call and/or a video call. In some embodiments, the type of call information includes a duration of the call. In some embodiments, the type of call information includes how the call was terminated, e.g., normal or dropped.

The following examples of mobile device information are collectable in isolation or in any combination with each other. In some embodiments, the mobile device information includes an operating system of the mobile device. In some embodiments, the mobile device information includes a brand and/or model information of the mobile device. In some embodiments, the mobile device information includes a battery level of the mobile device at various times during the call. In some embodiments, the mobile device information includes a temperature level of the mobile device at various times during the call.

In operation 230 call performance information is retrieved from the communication application. The call performance information includes data related to a quality of the call as well as information usable of identifying the call. In some embodiments, the call performance information is retrieved by querying the communication application and/or the operating system of the mobile device.

The following examples of call performance information are collectable in isolation or in any combination with each other. In some embodiments, the call performance information includes mean opinion score (MOS). The MOS is a rating ranging from 1 to 5 and is used to determine an overall quality of the call. In some embodiments, a MOS rating of 4 or above is considered good; a MOS rating of 3.1 to 4 is considered average; and a MOS rating of below 3.1 is considered poor. In some embodiments, analytics are performed only on calls having a poor MOS rating in order to conserve processing load. In some embodiments, analytics are performed only on calls having average or poor MOS ratings to conserve processing load. In some embodiments, analytics are performed on all calls regardless of MOS rating. In some embodiments, the call performance information includes a call token, which uniquely identifies the call for correlation of collected data. In some embodiments, call performance information includes packet loss during the call. In some embodiments, call performance information includes a number of packets sent during the call. In some embodiments, call performance information includes jitter. In some embodiments, call performance information includes round trip time (RTT).

In operation 235, the call data is transmitted to a server. The call data includes the call information and the call performance information. In some embodiments, the call data further includes network data retrieved from the mobile device. In some embodiments, the call data further includes call time, duration, and mobile device location to allow the server to retrieve network data from a log accessible by the server based on the time of the call and a location of the mobile device.

In some embodiments, the operation 235 is performed after the call is terminated. In some embodiments, the operation 235 is performed during the call, so that multiple transmissions of call data for a same call occur. These multiple transmissions of call data are able to be correlated based on call identifying formation, e.g., a call token. In some embodiments, the call data is stored on the mobile device and transmission of the call data is performed in response to detection of a trigger event. In some embodiments, the trigger event includes the mobile device having a battery level above a threshold battery level. In some embodiments, the threshold battery level is about 20% charge. In some embodiments, the trigger event includes connection of the mobile device or a WiFi network. In some embodiments, the trigger event includes the mobile device having a threshold level of connection with the telecommunication network. By delaying the transmission of the call data until a trigger event occurs, the method 200 is able to collect data for analyzing VOIP calls without significantly impacting performance of the mobile device for the user, which decreases customer satisfaction, in some instances.

In some embodiments, the call data is transmitted to the server using wireless communication, e.g., using the telecommunication network. In some embodiments, the call data is transmitted to the server using a wired connection. Once the call data is transmitted to the server, the server is able to perform analytics on the call data to determine performance of the network and identify root causes of a problem that potentially occurred during the call.

In some embodiments, the method 200 includes additional operations. For example, in some embodiments, the method 200 includes an authorization operation where the user grants access to the communication application to permit data retrieval from the communication application. In some embodiments, at least one operation of the method 200 is omitted. For example, in some embodiments, network data is not captured during method 200; instead, the network data is retrieved by the server based on time and location of the mobile device during the call. In some embodiments, an order of operations of the method 200 is adjusted. For example, in some embodiments, the operation 225 occurs after the operation 230.

Figure 3:
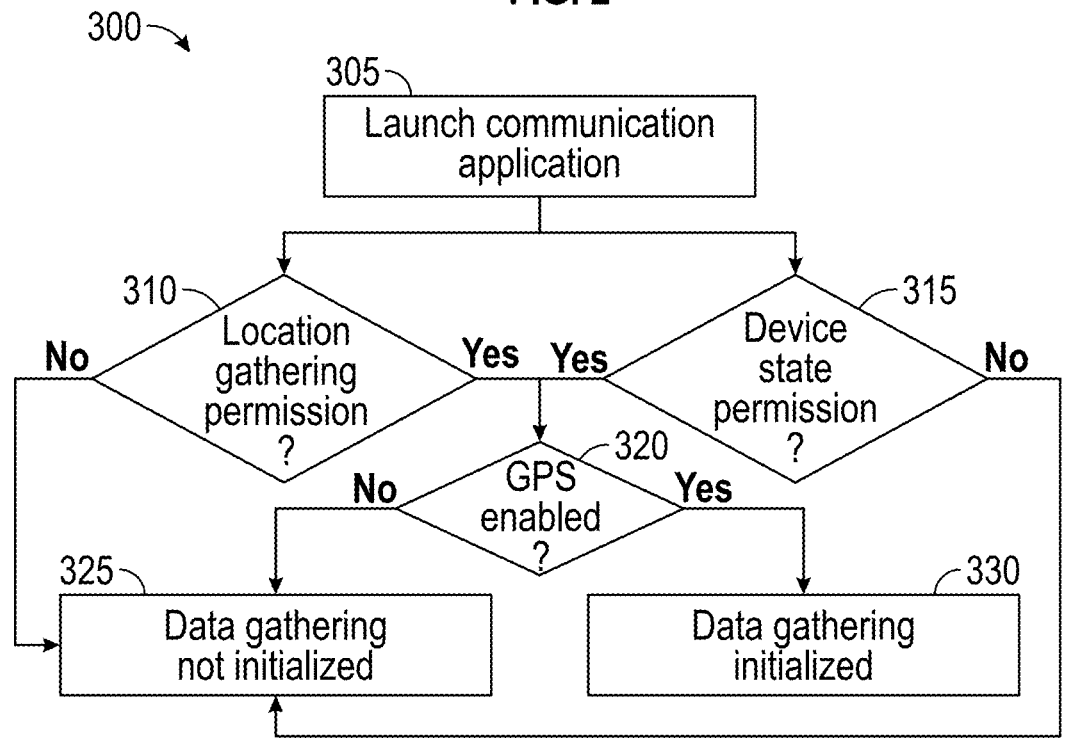
FIG. 3 is a flowchart of a method of determining whether data gathering is able to be initialized in accordance with some embodiments.

FIG. 3 is a flowchart of a method 300 of determining whether data gathering is able to be initialized in accordance with some embodiments. In some embodiments, the method 300 is usable to implement operation 210 of method 200 (FIG. 2). In some embodiments, the method 300 is usable separate from the method 200 (FIG. 2).

In operation 305, a communication application is launched. The communication application is launched by a mobile device accessible by a user. The communication application is capable of performing a VOIP call. In some embodiments, the communication application is launched in response to receiving an incoming call. In some embodiments, the communication application is launched in response to a detected interaction between the user and the mobile device, such as the user selecting the communication application on the mobile device.

In operation 310, a determination is made regarding whether location gathering is permitted. In some embodiments, the determination regarding location gathering is based on authorization from the user. In some embodiments, a prompt is displayed on the mobile device in response to performance of operation 305 requesting authorization to gather location data; and the determination is made based on a detected response to the prompt. In some embodiments, authorization from the user is requested prior to performance of operation 305, such as when a call analytics application is installed on the mobile device. In some embodiments, the determination is made based on a query to a system of the mobile device to determine whether the user previously authorized location gathering while the communication application launched in operation 305 is in use.

In response to a determination that location gathering is permitted, the method 300 proceeds to operation 320. In response to a determination that location gathering is not permitted, the method 300 proceeds to operation 325.

In operation 315, a determination is made regarding whether device state data gathering is permitted. Device state data includes information about the mobile device, such as brand, operating system, battery level, temperature, etc. In some embodiments, the determination regarding device state data gathering is based on authorization from the user. In some embodiments, a prompt is displayed on the mobile device in response to performance of operation 305 requesting authorization to gather device state data; and the determination is made based on a detected response to the prompt. In some embodiments, authorization from the user is requested prior to performance of operation 305, such as when a call analytics application is installed on the mobile device. In some embodiments, the determination is made based on a query to a system of the mobile device to determine whether the user previously authorized device state data gathering while the communication application launched in operation 305 is in use. In some embodiments, a prompt used to request authorization in operation 310 is used to simultaneously request authorization in operation 315. In some embodiments, separate prompts are used for operation 310 and operation 315.

In response to a determination that device state data gathering is permitted, the method 300 proceeds to operation 320. In response to a determination that device state data gathering is not permitted, the method 300 proceeds to operation 325.

In operation 320, a determination is made regarding whether a global position system (GPS), or other suitable location detecting component, of the mobile device is enabled. In some embodiments, the determination regarding whether GPS is enabled is based on a query to the system of the mobile device. In some embodiments, the determination regarding whether GPS is enabled is based on whether the mobile device has sufficient connection to the network to determine the location of the mobile device. In some embodiments, a prompt is displayed on the mobile device in response to a determination that the GPS is not enabled in order to request that the user enable the GPS; and the determination is made based on a detected response to the prompt. In some embodiments, a prompt used to request enabling of the GPS is used to simultaneously request authorization in operation 310 or to request authorization in operation 315. In some embodiments, separate prompts are used for operation 320, operation 310 and operation 315.

In response to a determination that the GPS is enabled, the method 300 proceeds to operation 330. In response to a determination that the GPS is not enabled, the method 300 proceeds to operation 325.

In operation 325, data gathering is not initialized. Failure to initialize data gathering means that the data will not be collected from the communication application related to any VOIP call initiated or received by the communication application.

In operation 330, data gather is initialized. Initialization of data gathering means that data will be collected from the communication application for at least a VOIP call corresponding to the launch of the communication application in operation 305. In some embodiments, the method 300 is repeated on each launch of the communication application. In some embodiments, the method 300 is performed on an initial launch of the communication application and preferences of the user are saved regarding whether to initialize data gather.

In some embodiments, the method 300 includes additional operations. For example, in some embodiments, the method 300 includes providing a notification to the user regarding whether data gathering is initialized. In some embodiments, at least one operation of the method 300 is omitted. For example, in some embodiments, operation 310 or operation 315 is omitted if authorization was previously received from the user. In some embodiments, an order of operations of the method 300 is adjusted. For example, in some embodiments, the operation 310 occurs simultaneously with the operation 315; or the operation 310 occurs before or after the operation 315.

Figure 4:
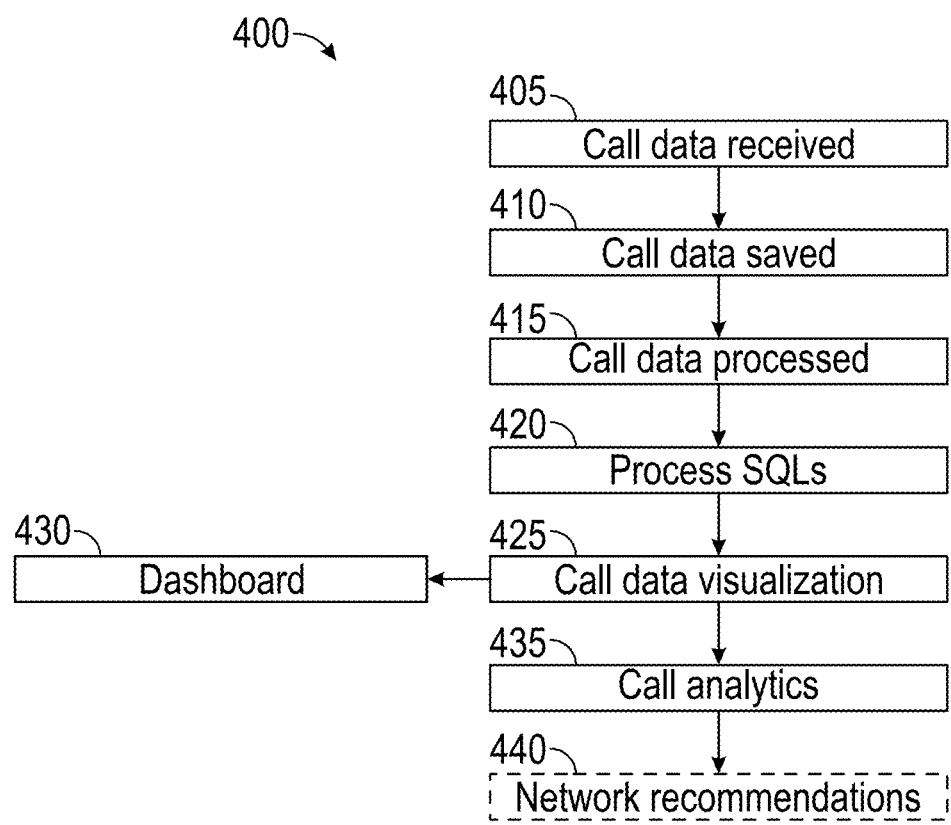
FIG. 4 is a flowchart of a method of analyzing VOIP communication in accordance with some embodiments.

FIG. 4 is a flowchart of a method 400 of analyzing VOIP communication in accordance with some embodiments. In some embodiments, the method 400 uses the call data from the method 200 (FIG. 2). In some embodiments, the method 400 uses call data other than call data from method 200 (FIG. 2).

In operation 405, call data is received. In some embodiments, the call data is received from a mobile device involved in the call. In some embodiments, the call data is received from an intermediate device between the mobile device and a server. In some embodiments, the call data is received wirelessly. In some embodiments, the call data is received via a wired connection. In some embodiments, the call data includes time and location information for the mobile device used during the call. In some embodiments, the call data includes call performance data, such as that discussed above. In some embodiment, the call data includes network performance data, such as that discussed above. In some embodiments, the call data includes mobile device information, such as that discussed above.

In operation 410, the call data is saved. The call data is saved to a non-transitory memory. In some embodiments, the call data is saved in a table based on a unique call identifier, such as a call token. In some embodiments, all of the saved call data is received in operation 405. In some embodiments, a portion of the saved call data is received in operation 405 and a portion of the saved call data is retrieved from a network log, which stores network performance data, based on time and location information received in operation 405. In some embodiments, the call data is saved in a same device that receives the call data in operation 405. In some embodiments, the call data is saved in a separate device from a device that receives the call data in operation 405.

In operation 415, the call data is processed. The call data is processed using a processor connected to the memory in which the call data is stored. Processing of the call data includes correlating the saved call data to identify root causes of a problem, if a problem exists, based on the call data. Processing of the call data facilitates determining a performance of the network which carried the call as well as a quality of the call experienced by the user.

In some embodiments, the processed call data is usable to determine holes, e.g., gap 125 (FIG. 1), in a coverage of a network. In some embodiments, the processed call data is usable to determine outages in portions of the network. In some embodiments, the processed call data is usable to determine a load on a network at various times of the day. In some embodiments, the processed call data is usable to determine whether a high number of calls are dropped in a certain location within the network. In some embodiments, the processed call data is usable to determine whether MOS ratings in certain areas of the network are average or poor. In some embodiments, the processed call data is usable to determine whether a device within the network is malfunctioning. In some embodiments, the processed call data is usable to determine whether a specific brand of mobile device or a specific mobile device operating system experiences a higher percentage of problems than other brands or operating systems using the network.

In some embodiments, the call data is processed only if the MOS rating of the call is poor. In some embodiments, the call data is process only if the MOS rating of the call is poor or average. In some embodiments, the call data is processed regardless of the MOS rating of the call.

In operation 420, structured query language (SQL) is used to further process the call data. The SQL are usable to define specific correlations between call data parameters which are of interest to a network monitor in order to increase efficiency in identifying root causes of problems. The SQL are processed using the processor. In some embodiments, the SQL are processed using a same processor as that used in operation 415. In some embodiments, the SQL are processed using a different processor from that used in operation 415. In some embodiments, the SQL are stored in the memory. In some embodiments, the SQL are process simultaneously with operation 415. In some embodiments, the SQL are process after operation 415. In some embodiments, the SQL are processed based on instructions received from a network monitor.

In operation 425, visualizations of the processed call data are generated. The visualizations help the network monitor to determine performance of the network based on the call data. In some embodiments, the visualizations include graphical representations. In some embodiments, the visualizations include map data overlaid with network performance determined based on the call data. In some embodiments, the visualizations include tabular data. In some embodiments, the visualizations are determined based on the SQL from operation 425. In some embodiments, the visualizations are selectable by the network monitor. For example, in some embodiments, the network monitor is able to select what type of visualization is desired, e.g., map, graphical, tabular, as well as one or more parameters of the call data to be displayed, e.g., MOS rating, dropped calls, types of calls, etc. The network monitor is able to select different combinations of parameters of the call data for visualization in order to help determine the performance of the network.

In operation 430, a dashboard view is displayed to the network monitor. The dashboard is a user interface (UI) capable of displaying the visualizations generated in operation 425. The dashboard is also capable of receiving input from the network monitor in order to provide additional visualizations based on a desired combination of parameters to be viewed by the network monitor. Some examples of dashboards are discussed below with respect to FIGS. 5 and 6, in some embodiments.

In operation 435, call analytics are performed. The call analytics identify whether a problem likely exists within the network. Using the visualizations and the call data, the processor is able to identify locations within the network that are likely experiencing problems, such as hardware failure, power outage, antenna misalignment, etc. For example, in response to a determination that a number of dropped calls within an area of the network exceeds a threshold value, the processor is able to determine that a problem likely exists with the base station servicing that area of the network. A repair/maintenance crew is able to be dispatched to the base station to determine whether repair or replacement of equipment at the base station is warranted, in some embodiments. In some embodiments, the network monitor is able to access the base station remotely and diagnose or attempt to resolve problems within the base stations remotely, such as by resetting a component of the base station.

In some embodiments, the call analytics are usable to determine how to enhance the network. For example, in some embodiments, a location where a volume of calls is high is selected to receive additional base stations to support the high call volume. Further, in some embodiments, based on a trend of MOS ratings over time, a determination about an ability of the network to continue to support the current performance of the network is determined. As a result, in some instances, the network is able to be efficiently expanded or enhanced based on historical performance and usage of the network in order to provide higher customer satisfaction with the network. One of ordinary skill in the art would understand that the above examples of call analytics are merely exemplary and that other analysis of the call data and visualizations are within the scope of this description.

The call analytics are also usable to determine whether specific brands of mobile devices are experiences more problems within the network than other brands of mobile devices. This information allows the network provider to determine whether to adjust components within the network. This information also allows customer service representatives to provide feedback to customers regarding complaints about mobile device performance. This information is also useful for mobile device providers to facilitate updates to software or hardware within the mobile device.

In optional operation 440, the processor provides network recommendations. The processor provides network recommendations based on the visualizations and the call data in order to assist with resolving network problems or expanding/enhancing network performance. In some embodiments, the processor generates an alert to the network monitor in response to a determination of poor MOS ratings in a certain area of the network being poor. In some embodiments, alerts are generated for other reasons, such as a large number of dropped calls, high RTT, large amount of packet loss, or other suitable criteria. In some embodiments, the alert includes an audio or visual alert. In some embodiments, the alert further includes a recommendation for resolution of the problem with the network. For example, in some embodiments, the alert includes a recommendation to remotely restart a component of the network. In some embodiments, the alert is transmitted to a device accessible by the network monitor. In some embodiments, the alert is transmitted wirelessly. In some embodiments, the alert is transmitted via a wired connection. One of ordinary skill in the art would understand that the above examples of network recommendations are merely exemplary and that other recommendations based on the call data and visualizations are within the scope of this description.

In some embodiments, the method 400 includes at least one additional operation. For example, in some embodiments, the method 400 further includes providing data to users of the mobile device regarding performance of different communication applications on the mobile device. In some embodiments, at least one operation of the method 400 is omitted. For example, in some embodiments, the optional operation 440 is omitted to reduce processing load. In some embodiments, an order of operations of the method 400 is adjusted. For example, in some embodiments, operations 415 and 420 are performed simultaneously.

Figure 5:
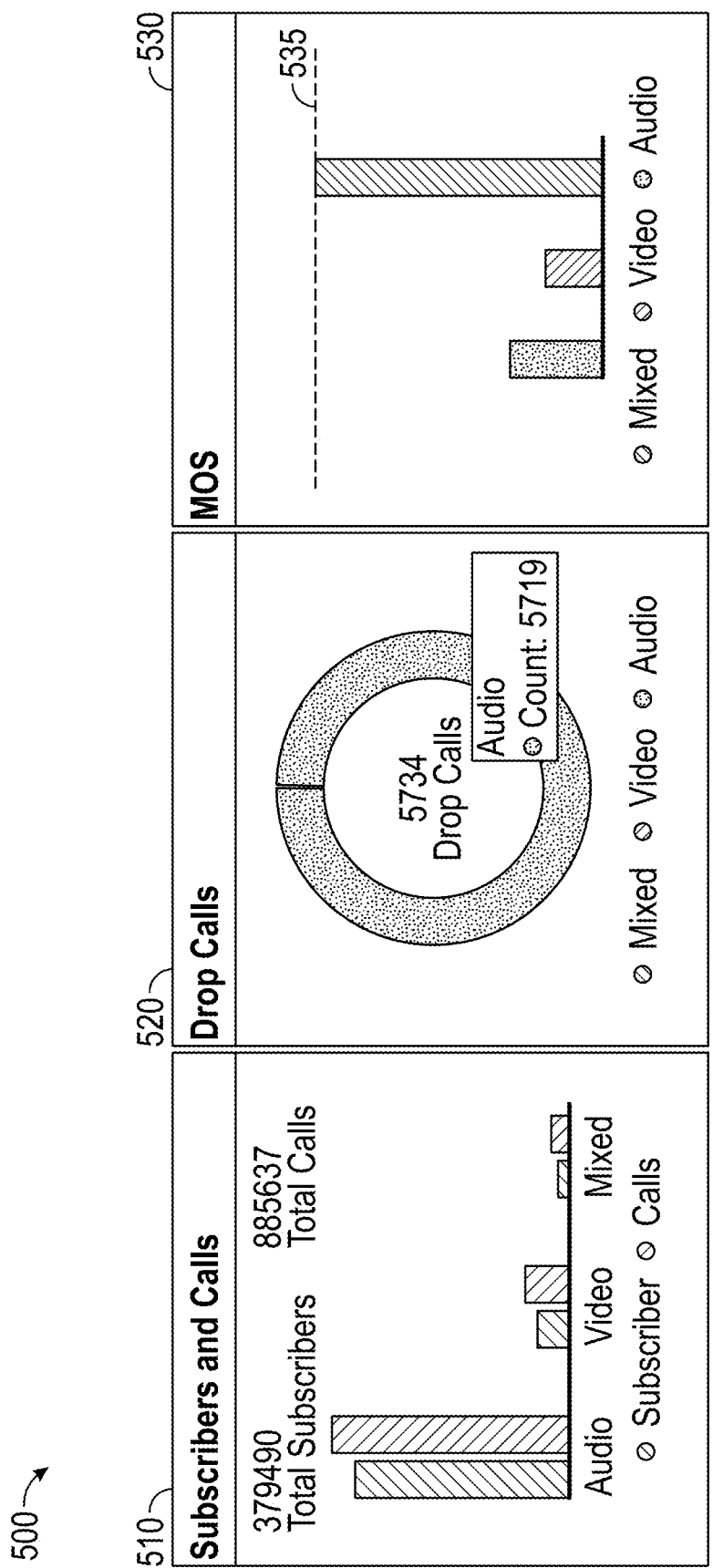
FIG. 5 is a diagram of a user interface (UI) for displaying VOIP performance data in accordance with some embodiments.

FIG. 5 is a diagram of a user interface (UI) 500 for displaying VOIP performance data in accordance with some embodiments. The UI 500 is usable to provide a visual representation of processed call data for a network monitor to access the performance of the network. In some embodiments, the UI 500 is a dashboard displayed to the network monitor as part of operation 430 of the method 400 (FIG. 4). In some embodiments, the UI 500 is generated by a method other than method 400 (FIG. 4).

The UI 500 includes a first window 510 which displays a bar graph of a number of subscribers and a number of calls for different types of calls. Information in the first window 510 is useful for allowing the network monitor to determine the number of types of calls being placed by users within the network. The information in the first window 510 is also useful for determining a ratio between a number of subscribers making calls and the total number of calls. This helps the network monitor to forecast future demands on the network.

The UI 500 includes a second window 520 which displays graph of a number and type of dropped calls in the network. Knowing the number of dropped calls in the network helps the network monitor to determine whether an outage within the network is likely occurring. The types of calls being dropped also helps with a determination regarding whether the network has sufficient resources to handle communication that utilizes a higher amount of bandwidth, such as video calls.

The UI 500 includes a third window 530 which displays a bar graph of a MOS rating for different types of calls within the network. The MOS ratings help the network monitor determine whether the network is providing sufficient quality of service to subscribers. For example, the MOS rating for audio calls in the third window reaches the threshold line 535. However, the MOS ratings for video and mixed calls fall below the threshold line 535. Based on this information, a network monitor would be able to determine that additional base stations or upgraded components within the network would be desirable to increase the quality of higher bandwidth communication such as video calls, in some instances.

One of ordinary skill in the art would understand that the types of visualizations in UI 500 as well as the information displayed in the UI 500 is exemplary and that other combinations of visualizations and parameters are within the scope of this description.

Figure 6:
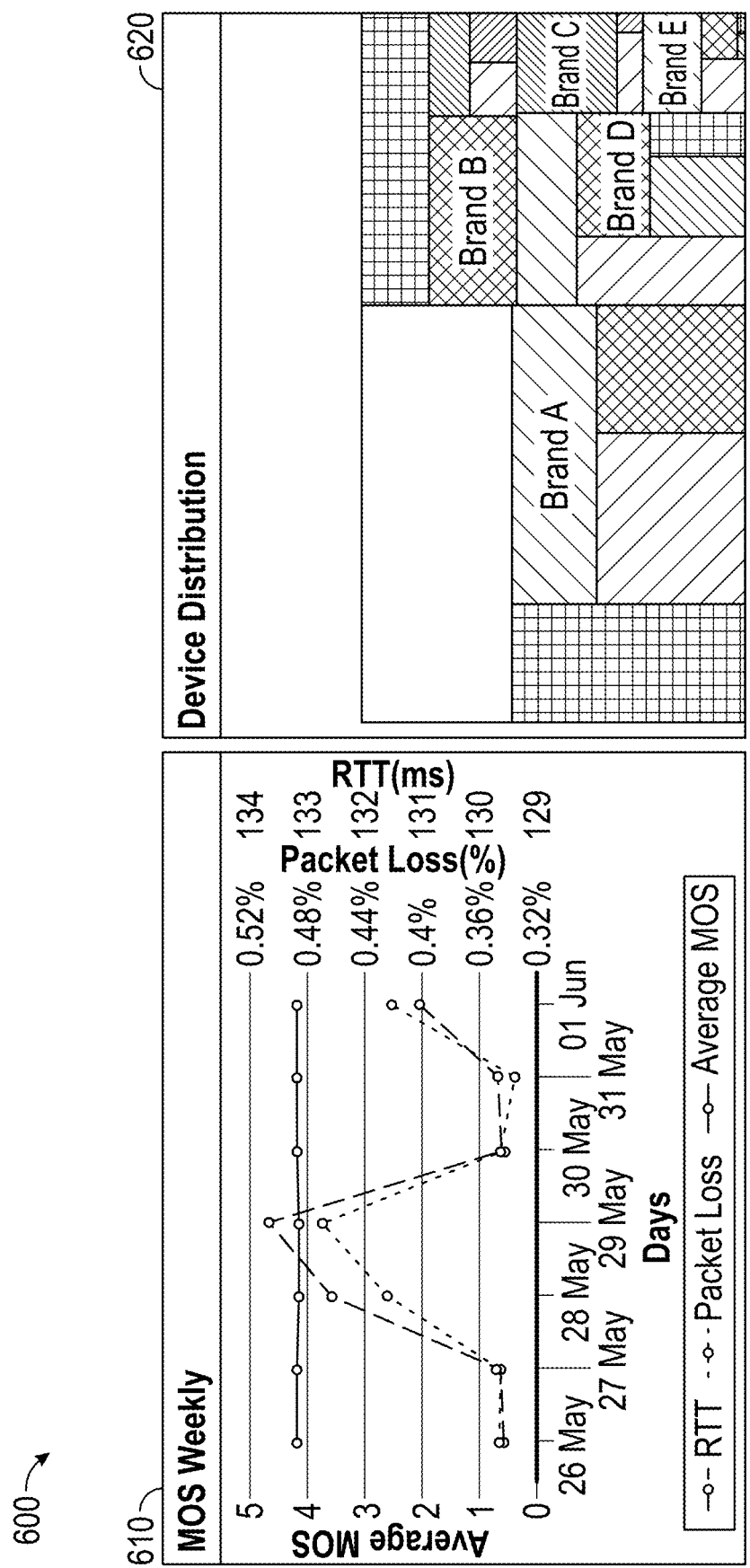
FIG. 6 is a diagram of a UI for displaying VOIP performance data in accordance with some embodiments.

FIG. 6 is a diagram of a UI 600 for displaying VOIP performance data in accordance with some embodiments. The UI 600 is usable to provide a visual representation of processed call data for a network monitor to access the performance of the network. In some embodiments, the UI 600 is a dashboard displayed to the network monitor as part of operation 430 of the method 400 (FIG. 4). In some embodiments, the UI 600 is generated by a method other than method 400 (FIG. 4). In some embodiments, the UI 600 is capable of being displayed using a same device as the UI 500. In some embodiments, the UI 600 is displayed using a different device as the UI 500.

The UI 600 includes a first window 610 which displays a line graph of performance parameters for different days. The performance parameters include MOS, RTT and packet loss. The average MOS rating for the calls on the network over the displayed time period is above 4 and is likely to be considered good. However, the RTT and packet loss show a spike at the date of May 29. Based on this information, the network monitor would be able to recognize a potential problem, such as an outage, occurred within the network on May 29.

The UI 600 includes a second window 620 which displays a visual representation of type of devices that accessed the network over a time period. This data is useful to determine how to enhance the network to accommodate brands of devices which are popular with subscribers to the network in order to enhance customer satisfaction. This data also assists in the determination of device brands that experience problems with the network, in some instances.

One of ordinary skill in the art would understand that the types of visualizations in UI 600 as well as the information displayed in the UI 600 is exemplary and that other combinations of visualizations and parameters are within the scope of this description.

Figure 7:
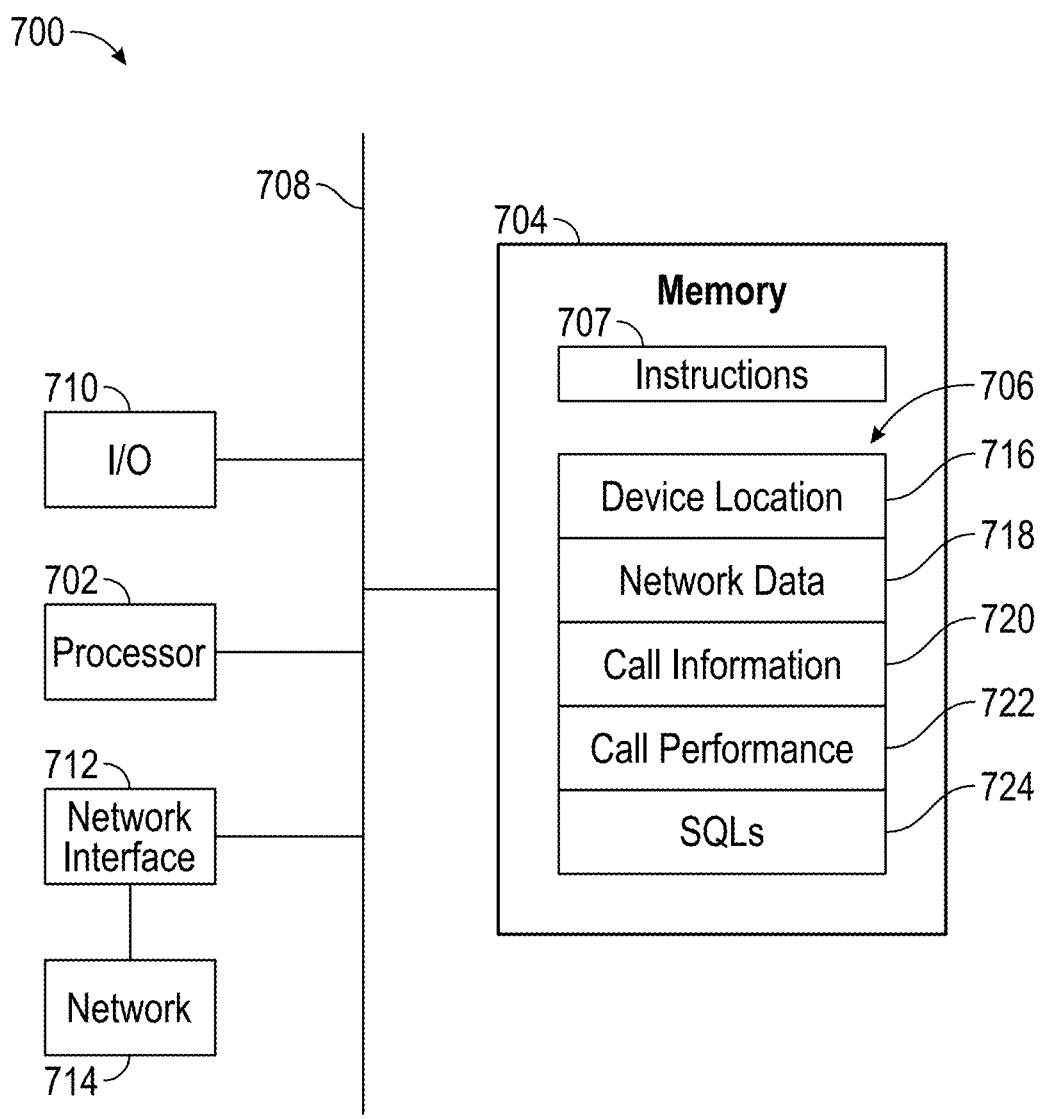
FIG. 7 is a block diagram of a system for implementing VOIP communication analytics in accordance with some embodiments.

FIG. 7 is a block diagram of a system 700 for implementing call analytics in accordance with some embodiments. System 700 includes a hardware processor 702 and a non-transitory, computer readable storage medium 704 encoded with, i.e., storing, the computer program code 706, i.e., a set of executable instructions. Computer readable storage medium 704 is also encoded with instructions 707 for interfacing with external devices. The processor 702 is electrically coupled to the computer readable storage medium 704 via a bus 708. The processor 702 is also electrically coupled to an I/O interface 710 by bus 708. A network interface 712 is also electrically connected to the processor 702 via bus 708. Network interface 712 is connected to a network 714, so that processor 702 and computer readable storage medium 704 are capable of connecting to external elements via network 714. The processor 702 is configured to execute the computer program code 706 encoded in the computer readable storage medium 704 in order to cause system 700 to be usable for performing a portion or all of the operations as described in method 200 (FIG. 2), method 300 (FIG. 3), method 400 (FIG. 4), to generate UI 500 (FIG. 5), or to generate UI 600 (FIG. 6).

In some embodiments, the processor 702 is a central processing unit (CPU), a multi-processor, a distributed processing system, an application specific integrated circuit (ASIC), and/or a suitable processing unit.

In some embodiments, the computer readable storage medium 704 is an electronic, magnetic, optical, electromagnetic, infrared, and/or a semiconductor system (or apparatus or device). For example, the computer readable storage medium 704 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 704 includes a compact disk-read only memory (CD-ROM), a compact disk-read/write (CD-R/W), and/or a digital video disc (DVD).

In some embodiments, the storage medium 704 stores the computer program code 706 configured to cause system 700 to perform a portion or all of the operations as described in method 200 (FIG. 2), method 300 (FIG. 3), method 400 (FIG. 4), to generate UI 500 (FIG. 5), or to generate UI 600 (FIG. 6). In some embodiments, the storage medium 704 also stores information for performing a portion or all of the operations as described in method 200 (FIG. 2), method 300 (FIG. 3), method 400 (FIG. 4), to generate UI 500 (FIG. 5), or to generate UI 600 (FIG. 6) as well as information generated during performing a portion or all of the operations as described in method 200 (FIG. 2), method 300 (FIG. 3), method 400 (FIG. 4), to generate UI 500 (FIG. 5), or to generate UI 600 (FIG. 6), such as a device location parameter 716, a network data parameter 718, a call information parameter 720, a call performance parameter 722, a SQL parameter 724 and/or a set of executable instructions to perform a portion or all of the operations as described in method 200 (FIG. 2), method 300 (FIG. 3), method 400 (FIG. 4), to generate UI 500 (FIG. 5), or to generate UI 600 (FIG. 6).

In some embodiments, the storage medium 704 stores instructions 707 for interfacing with external devices. The instructions 707 enable processor 702 to generate and receive instructions readable by the external devices to effectively perform a portion or all of the operations as described in method 200 (FIG. 2), method 300 (FIG. 3), method 400 (FIG. 4), to generate UI 500 (FIG. 5), or to generate UI 600 (FIG. 6).

System 700 includes I/O interface 710. I/O interface 710 is coupled to external circuitry. In some embodiments, I/O interface 710 includes a keyboard, keypad, mouse, trackball, trackpad, and/or cursor direction keys for communicating information and commands to processor 702.

System 700 also includes network interface 712 coupled to the processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in method 200 (FIG. 2), method 300 (FIG. 3), method 400 (FIG. 4), to generate UI 500 (FIG. 5), or to generate UI 600 (FIG. 6) is implemented in two or more systems 700, and information is exchanged between different systems 700 via network 714.

An aspect of this description relates to a method of performing call analytics. The method includes initiating a call on a mobile device, wherein the mobile device is connected to a network, and the call is initiated on a communication application executed by the mobile device. The method further includes determining whether data gathering for the communication application is initialized. The method further includes in response to determining that data gathering for the communication application is initialized: capturing a location of the mobile device; capturing a time of the initiated call; retrieving call information data from the communication application; retrieving call performance data from the communication application; and transmitting the location of the mobile device, the time of the initiated call, the call information data, and the call performance data. In some embodiments, determining whether data gathering for the communication application is initiated includes: determining whether location gathering is permitted; determining whether gathering device state information is permitted; determining whether a global position system (GPS) of the mobile device is enabled; and determining that the data gathering for the communication application is initialized in response to all of location gathering being permitting, gather device state information being permitted, and the GPS being enabled. In some embodiments, determining whether the data gathering for the communication application is initiated includes determining that the data gathering for the communication application is not initialized in response to any of location gathering not being permitting, gather device state information not being permitted, or the GPS not being enabled. In some embodiments, the method further includes capturing network performance data from the mobile device; and transmitting the network performance data to the mobile device in response to a determination that the data gathering for the communication application is initialized. In some embodiments, initiating the call includes receiving an incoming call on the mobile device. In some embodiments, initiating the call includes generating the call on the mobile device using the communication application. In some embodiments, retrieving the call performance data includes retrieving a mean opinion score (MOS) rating for the call. In some embodiments, the transmitting includes transmitting the location of the mobile device, the time of the initiated call, the call information data, and the call performance data in response to a detected termination of the call.

An aspect of this description relates to a method of performing call analytics. The method includes receiving call data. The call data includes a time of a call performed using a mobile device connected to a network, a location of the mobile device during the call, call information data, and call performance data. The method further includes processing the call data, wherein processing the call data comprises correlating call performance data with network performance data based on the call information data. The method further includes generating at least one visualization based on the processed call data. The method further includes displaying the at least one visualization. The method further includes determining a network performance during the call based on the at least one visualization. In some embodiments, the method further includes retrieving the network performance data based on the time of the call and the location of the mobile device during the call. In some embodiments, receiving the call data includes receiving call data retrieved from a communication application, and the call includes a voice over internet protocol (VOIP) call. In some embodiments, generating the at least one visualization includes generating at least one graphical representation of the processed call data. In some embodiments, the processing the call data includes correlating data based on a unique call identifier received in the call data. In some embodiments, the method further includes changing the at least one visualization to a second visualization in response to receiving an input from a user. In some embodiments, the method further includes generating a recommendation for enhancement to the network based on the determined network performance during the call.

An aspect of this description relates to a system for performing call analytics. The system includes a non-transitory computer readable medium configured to store instructions thereon. The system further includes a processor connected to the non-transitory computer readable medium. The processor is configured to execute the instructions for receiving call data. The call data includes: a time of a call performed using a mobile device connected to a network, a location of the mobile device during the call, call information data, and call performance data. The processor is further configured to execute the instructions for processing the call data, wherein processing the call data comprises correlating call performance data with network performance data based on the call information data. The processor is further configured to execute the instructions for generating at least one visualization based on the processed call data. The processor is further configured to execute the instructions for instructing a display to display the at least one visualization. The processor is further configured to execute the instructions for determining a network performance during the call based on the at least one visualization. In some embodiments, the processor is further configured to execute the instructions for retrieving the network performance data based on the time of the call and the location of the mobile device during the call. In some embodiments, the processor is configured to execute the instructions for receiving the call data retrieved from a communication application, and the call includes a voice over internet protocol (VOIP) call. In some embodiments, the processor is configured to execute the instructions for processing the call data by correlating data based on a unique call identifier in the received call data. In some embodiments, the processor is configured to execute the instructions for generating a recommendation for enhancement to the network based on the determined network performance during the call.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of performing call analytics, the method comprising:
    initiating a call on a mobile device, wherein the mobile device is connected to a network, and the call is initiated on a communication application executed by the mobile device;
    determining whether data gathering for the communication application is initialized;
    in response to determining that data gathering for the communication application is initialized:
       capturing a location of the mobile device;
       capturing a time of the initiated call;
       retrieving call information data from the communication application;
       retrieving call performance data from the communication application; and
       transmitting the location of the mobile device, the time of the initiated call, the call information data, and the call performance data; and
    in response to determining that data gathering for the communication application is not initialized inhibiting data capture from the communication application.

2. The method of claim 1, wherein determining whether data gathering for the communication application is initiated comprises:
    determining whether location gathering is permitted;
    determining whether gathering device state information is permitted;
    determining whether a global position system (GPS) of the mobile device is enabled; and
    determining that the data gathering for the communication application is initialized in response to all of location gathering being permitting, gather device state information being permitted, and the GPS being enabled.

3. The method of claim 2, wherein determining whether the data gathering for the communication application is initiated comprises:
    determining that the data gathering for the communication application is not initialized in response to any of location gathering not being permitting, gather device state information not being permitted, or the GPS not being enabled.

4. The method of claim 1, further comprising:
    capturing network performance data from the mobile device; and transmitting the network performance data to the mobile device in response to a determination that the data gathering for the communication application is initialized.

5. The method of claim 1, wherein initiating the call comprises receiving an incoming call on the mobile device.

6. The method of claim 1, wherein initiating the call comprises generating the call on the mobile device using the communication application.

7. The method of claim 1, wherein retrieving the call performance data comprises retrieving a mean opinion score (MOS) rating for the call.

8. The method of claim 1, wherein the transmitting comprises transmitting the location of the mobile device, the time of the initiated call, the call information data, and the call performance data in response to a detected termination of the call.

9. A method of performing call analytics, the method comprising:
  receiving call data related to a communication application on a mobile device in response to the communication application being initialized for data gathering, wherein the call data comprises:
    a time of a call performed using the mobile device connected to a network,
    a location of the mobile device during the call,
    call information data, and
    call performance data;
  processing the call data, wherein processing the call data comprises correlating call performance data with network performance data based on the call information data;
  generating at least one visualization based on the processed call data;
  displaying the at least one visualization;
  determining a network performance during the call based on the at least one visualization; and
  in response to determining that data gathering for the communication application is not initialized inhibiting data capture from the communication application.

10. The method of claim 9, further comprising retrieving the network performance data based on the time of the call and the location of the mobile device during the call.

11. The method of claim 9, wherein receiving the call data comprises receiving call data retrieved from the communication application, and the call comprises a voice over internet protocol (VOIP) call.

12. The method of claim 9, wherein generating the at least one visualization includes generating at least one graphical representation of the processed call data.

13. The method of claim 9, wherein the processing the call data comprises correlating data based on a unique call identifier received in the call data.

14. The method of claim 9, further comprising changing the at least one visualization to a second visualization in response to receiving an input from a user.

15. The method of claim 9, further comprising generating a recommendation for enhancement to the network based on the determined network performance during the call.

16. A system for performing call analytics, the system comprising:
  a non-transitory computer readable medium configured to store instructions thereon; and
  a processor connected to the non-transitory computer readable medium, wherein the processor is configured to execute the instructions for:
    receiving call data related to a communication application on a mobile device in response to the communication application being initialized for data gathering, wherein the call data comprises:
      a time of a call performed using the mobile device connected to a network,
      a location of the mobile device during the call,
      call information data, and
      call performance data;
    processing the call data, wherein processing the call data comprises correlating call performance data with network performance data based on the call information data;
    generating at least one visualization based on the processed call data;
    instructing a display to display the at least one visualization; and
    determining a network performance during the call based on the at least one visualization; and
    in response to determining that data gathering for the communication application is not initialized inhibiting data capture from the communication application.

17. The system of claim 16, wherein the processor is further configured to execute the instructions for retrieving the network performance data based on the time of the call and the location of the mobile device during the call.

18. The system of claim 16, wherein the processor is configured to execute the instructions for receiving the call data retrieved from the communication application, and the call comprises a voice over internet protocol (VOIP) call.

19. The system of claim 16, wherein the processor is configured to execute the instructions for processing the call data by correlating data based on a unique call identifier in the received call data.

20. The system of claim 16, wherein the processor is configured to execute the instructions for generating a recommendation for enhancement to the network based on the determined network performance during the call.

* * * * *